United States Patent
Khodor et al.

(10) Patent No.: US 8,641,059 B2
(45) Date of Patent: Feb. 4, 2014

(54) FOLDING CHASSIS FOR MANUALLY DRIVEN CARRIER VEHICLES CAPABLE OF TRAVERSING OBSTACLES

(75) Inventors: Leonid Khodor, Orange, OH (US); Julia Khodor-Beloborodov, West Roxbury, MA (US)

(73) Assignee: Trifold, LLC, Orange, OH (US)

( * ) Notice: Subject to any disclaimer, the term of this patent is extended or adjusted under 35 U.S.C. 154(b) by 0 days.

(21) Appl. No.: 13/575,007

(22) PCT Filed: Feb. 3, 2011

(86) PCT No.: PCT/US2011/023655
§ 371 (c)(1),
(2), (4) Date: Jul. 24, 2012

(87) PCT Pub. No.: WO2011/097419
PCT Pub. Date: Aug. 11, 2011

(65) Prior Publication Data
US 2012/0292889 A1     Nov. 22, 2012

Related U.S. Application Data

(60) Provisional application No. 61/302,537, filed on Feb. 8, 2010, provisional application No. 61/432,923, filed on Jan. 14, 2011.

(51) Int. Cl.
*B62B 1/00* (2006.01)

(52) U.S. Cl.
USPC ............... 280/47.28; 280/47.29; 280/652

(58) Field of Classification Search
USPC .......... 280/47.27, 43.11, 43.14, 47.19, 47.23, 280/47.24, 47.17, 651, 43.1
See application file for complete search history.

(56) References Cited

U.S. PATENT DOCUMENTS

| | | | |
|---|---|---|---|
| 2,699,951 A | 1/1955 | Gans | |
| 3,346,269 A * | 10/1967 | Soto | 280/5.26 |
| 5,468,005 A | 11/1995 | Yang | |
| 5,630,601 A | 5/1997 | vom Braucke | |
| 5,803,471 A | 9/1998 | DeMars | |
| 6,557,869 B2 * | 5/2003 | Gillette et al. | 280/47.28 |
| 6,874,799 B2 | 4/2005 | Roberson | |
| 7,387,306 B2 * | 6/2008 | Zimmer | 280/47.29 |
| 7,631,380 B1 | 12/2009 | Larson | |
| 7,669,862 B2 | 3/2010 | Kamara et al. | |
| 2007/0075509 A1 | 4/2007 | Wyrick, III | |
| 2007/0222165 A1 | 9/2007 | Hope | |

* cited by examiner

*Primary Examiner* — John Walters
*Assistant Examiner* — James Triggs
(74) *Attorney, Agent, or Firm* — Leonid Khodor

(57) ABSTRACT

Disclosed is a folding chassis of manually driven carrier vehicles, for example, hand trucks, carts, and strollers, capable of moving over uneven or spongy surfaces and surmounting obstacles. The chassis includes a frame having a first plane, an arm with an axle, and a hub having a plurality of wheels. The arm is rotatably attached to the frame with the hub rotatably disposed onto the axle and each of the plurality of wheels is rotatably attached to said hub around an axis parallel to said axle. The arm is configured to pivot between at least positions of the hub been generally perpendicular to said first plane and the hub been juxtaposed to said first plane.

14 Claims, 17 Drawing Sheets

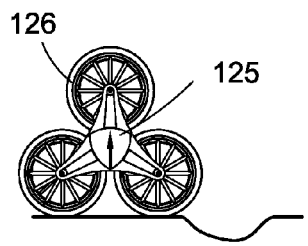 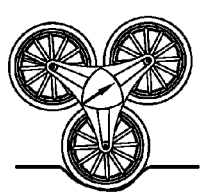 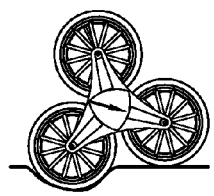 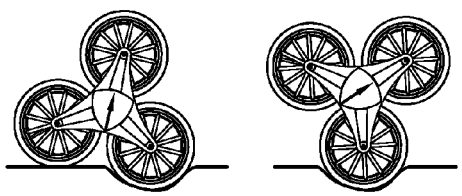
FIG. 5A　　FIG. 5B　　FIG. 5C　　FIG. 5D
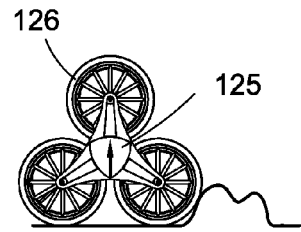 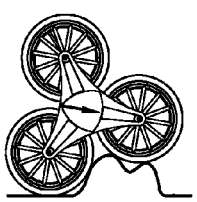 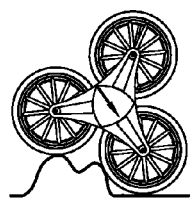 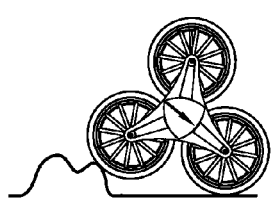
FIG. 6A　　FIG. 6B　　FIG. 6C　　FIG. 6D
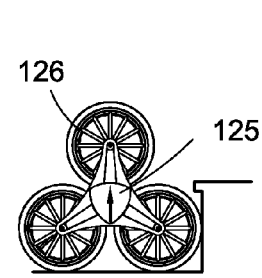 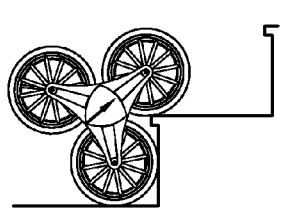 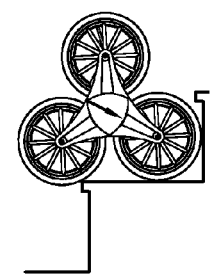 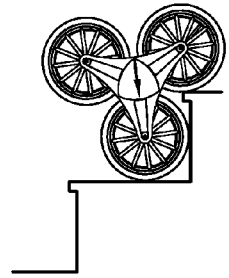
FIG. 7A　　FIG. 7B　　FIG. 7C　　FIG. 7D

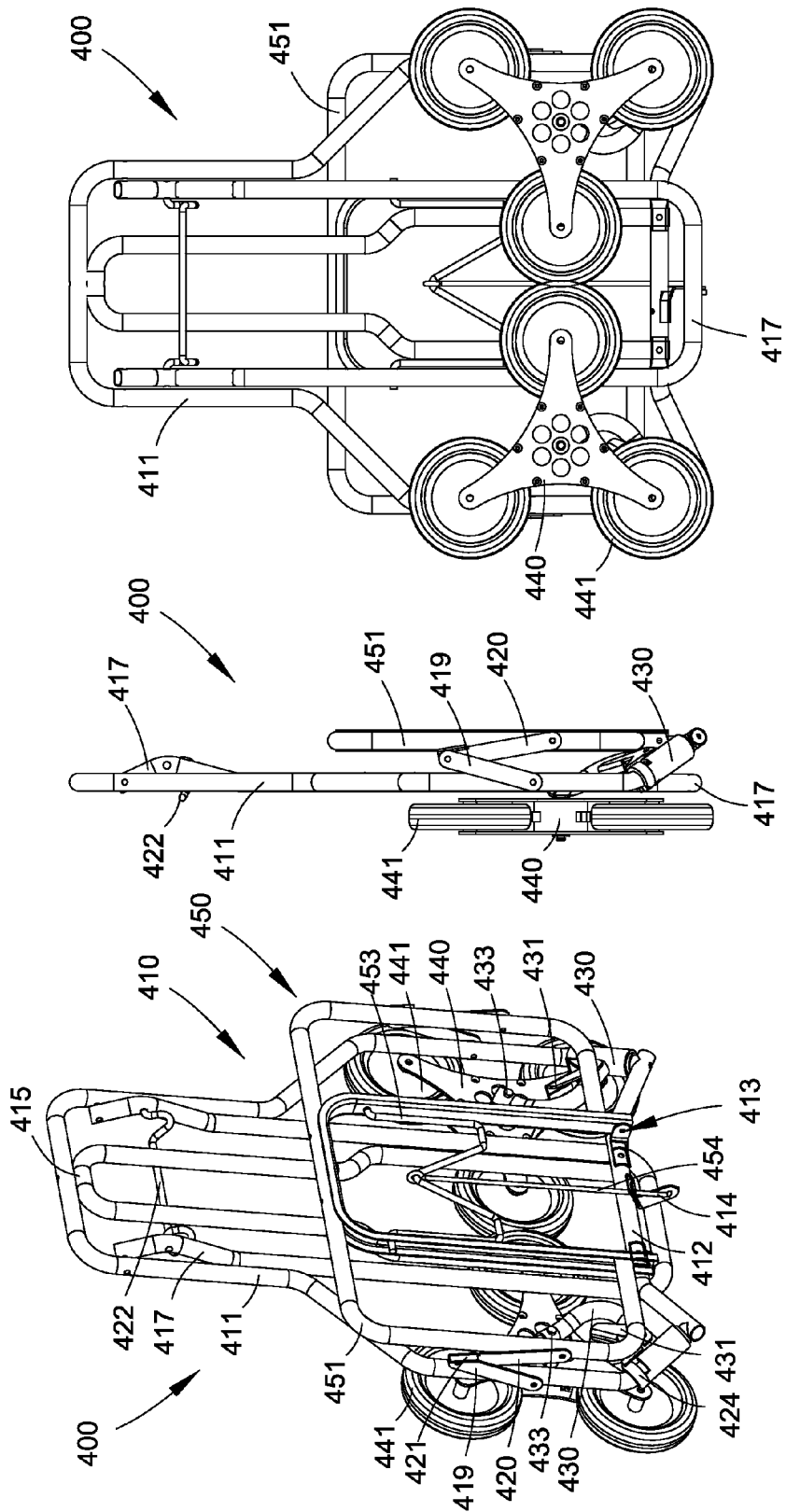

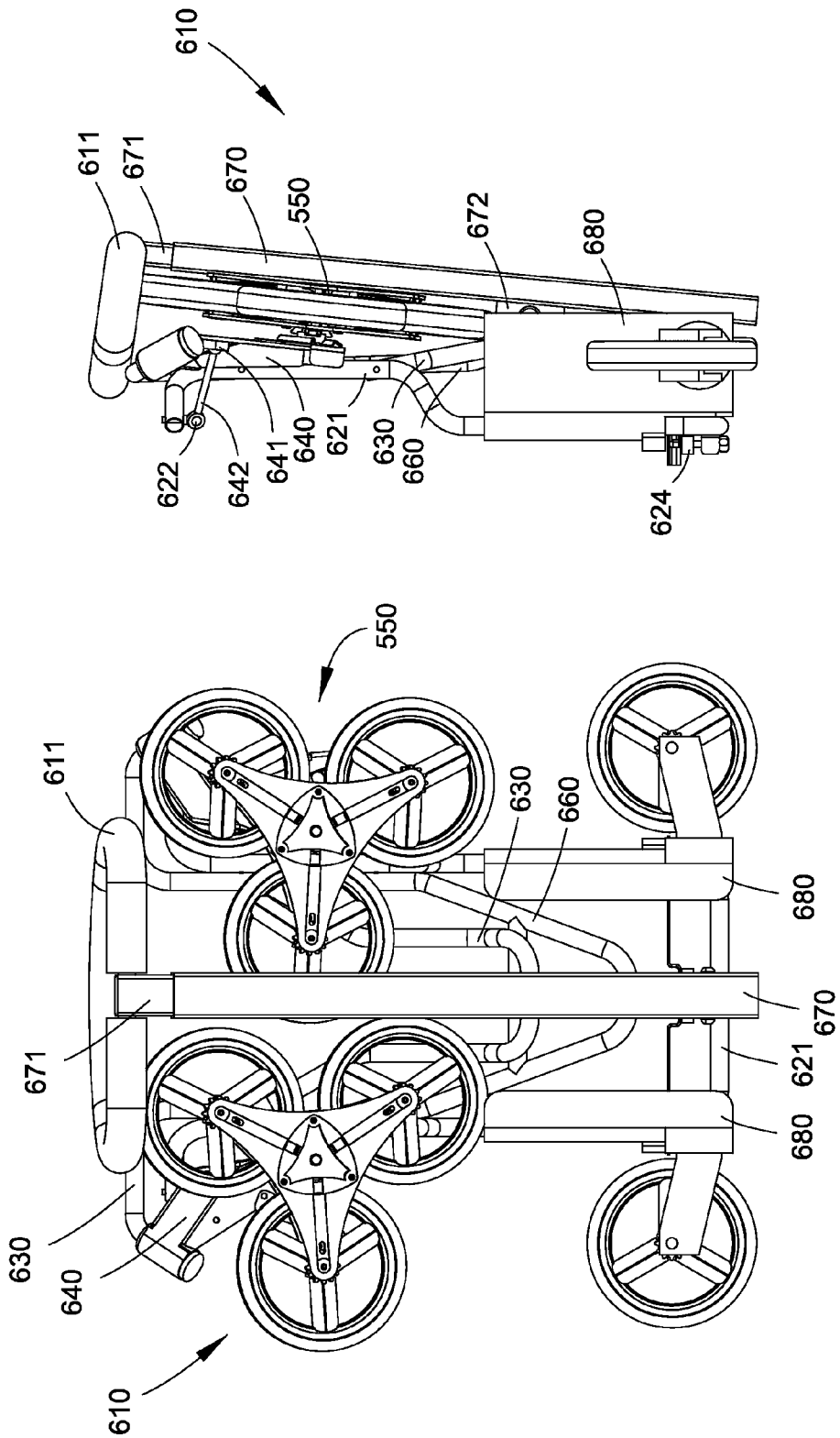

FOLDING CHASSIS FOR MANUALLY DRIVEN CARRIER VEHICLES CAPABLE OF TRAVERSING OBSTACLES

FIELD OF THE INVENTION

The present invention generally relates to manually driven carrier vehicles, such as pushable carts, wheelchairs, barrows, carriages, and strollers and, more particularly, to a folding chassis therefor capable of traversing obstacles.

BACKGROUND OF THE INVENTION

Various manually driven carrier vehicles, for example, hand trucks, carts and strollers, are commonly used for moving objects that are otherwise inconvenient for a person to carry due to size and/or weight, or for transporting infants and toddlers. Often, these carts and strollers have foldable chassis for ease of storage and transportation when not in use. These carriers typically have a telescoping or folding handle, a folding chassis, and wheels set into a predetermined position. Such carts and strollers often have limited capability to traverse rough or uneven terrain because the portability requirement in the folded state limits the range of possible wheel diameters, which, in turn, limits suspension responsiveness. This is because the efforts of moving a cart or a stroller at a given coefficient of friction depend inversely on ratios of wheel to axle diameters and the wheel diameter to height of an obstacle. Other carriers, besides having a telescoping or folding handle and a folding chassis, utilize removable wheels of relatively large size as means to improve terrain trafficability, yet reduce overall dimensions in the folded state. However, removing the wheels requires additional time and complicates handling and storage of the carrier, particularly after use on wet or muddy surfaces.

Thus, conventional folding carts and strollers, in addition to be able to transport a predetermined load, are designed primarily for convenient handling and portability when folded. However, these known carts and strollers, independently of any trade-offs between the convenience of use and the size in the folded state, are difficult to handle when moving over an irregular terrain, curbs, stairs, and other obstacles. Carrier chassis better capable of dealing with uneven surfaces are inconvenient to store or transport when folded.

Therefore, it is desirable to provide a folding carrier chassis capable of moving over a rough terrain, including curbs, stairs, and spongy soil. Additionally, it is desirable to have such carrier chassis be foldable relatively flat to provide for ease of storage and transportation. Further, such chassis should preferably be easily folded without disassembling.

SUMMARY OF THE INVENTION

The present invention generally focuses on a manually driven and foldable carrier vehicle capable of moving over uneven or spongy surfaces and surmounting obstacles. More particularly, the invention relates to a carrier having a chassis capable of climbing up and down (i.e. "walking") over curbs, stairs, and other obstacles, that is easy to handle, convenient to use, and folds flat. Particularly, in its various embodiments and implementations, the invention provides for a decreased pressure applied by the chassis onto an underlying terrain, improved stability, decreased pull/push forces especially for moving over the irregular terrain, and improved portability when folded. Furthermore, the present invention facilitates broader participation in outdoor activities by allowing physically challenged persons to go with the carrier anywhere easily.

In general, in one aspect, a folding chassis includes a frame having a first plane, an arm with an axle, said arm pivotally attached to said frame; and a hub having a plurality of wheels and rotatably disposed onto said axle. Each of said plurality of wheels is attached to said hub rotatably around an axis parallel to said axle and said arm is configured to pivot between at least positions of said hub being generally perpendicular to said first plane and said hub been juxtaposed to said first plane. Various embodiments and implementations of this aspect of the invention include the following features:

The arm is configured to pivot around an axis positioned at acute angles in relation to said first plane and to a plane perpendicular to the first plane. The plurality of wheels includes three wheels positioned symmetrically relative to said axle. The arm includes a guard member for preventing interference between a load and said plurality of wheels. The folding chassis may further include a handle configured to extend the frame and a detachable carrier with a rim and a brace, wherein said rim attachable to said handle at a plurality of levels and said brace is pivotally attachable to the frame.

In general, in another aspect, the invention relates to a folding chassis including a frame having a first plane; an arm with an axle, said arm rotatably attached to said frame; a platform rotatably attached to said frame and linked to said arm and configured to pivot within a predetermined range relative to said first plane; and a hub having a plurality of wheels, said hub rotatably disposed onto said axle. Each of said plurality of wheels is rotatably attached to said hub around an axis parallel to said axle and said arm is configured to pivot between at least positions of said hub being generally perpendicular to said first plane and said hub being juxtaposed to said first plane. Various embodiments and implementations of this aspect of the invention include the following features:

The arm is configured to pivot around an axis positioned at acute angles in relation to said first plane and to a plane perpendicular to the first plane. The folding chassis further includes a first support and a second support, wherein said first support attached rotatable to said frame, said second support attached rotatable to said platform and said first support, and said first and second supports configured to be fixable relative to one another in at least one position. The plurality of wheels consists of three wheels positioned symmetrically regarding said axle. The folding chassis may further include at least one caster configured to pivot relative to said platform and be fixable relative to said platform in at least one position.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of the invention.

FIGS. 5A-7D depict the hub in various phases of moving over obstacles, according to various embodiments of the present invention.

FIGS. 12A-12C depict respectively perspective, side, and back views of the embodiment shown in FIG. 11.

FIGS. 19A-19B depict front and side views of the embodiment shown in FIG. 18C.

DETAILED DESCRIPTION

Figure 1:
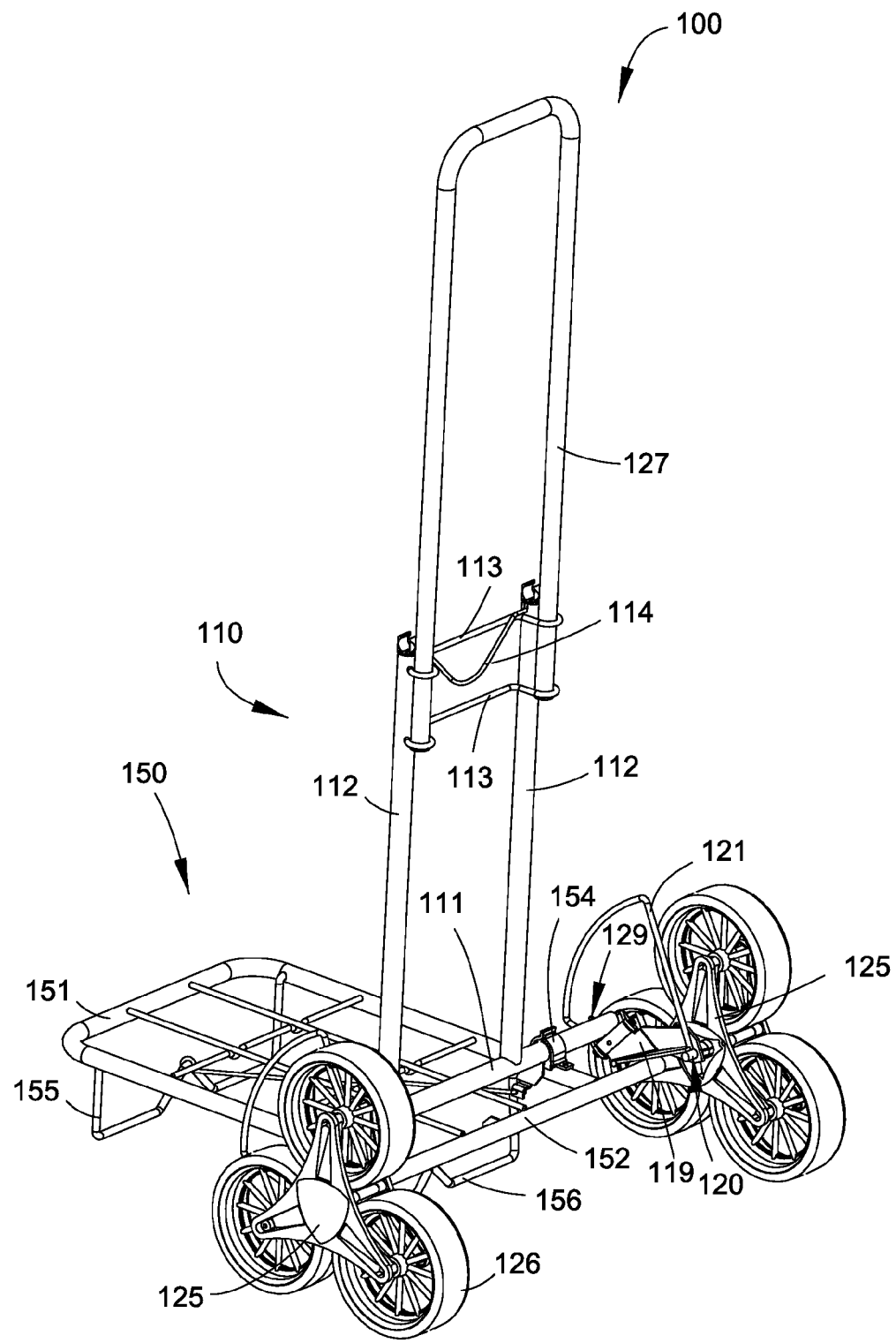
FIG. 1 depicts a perspective view of an embodiment of a cart chassis in unfolded state according to present invention.
Figure 2:
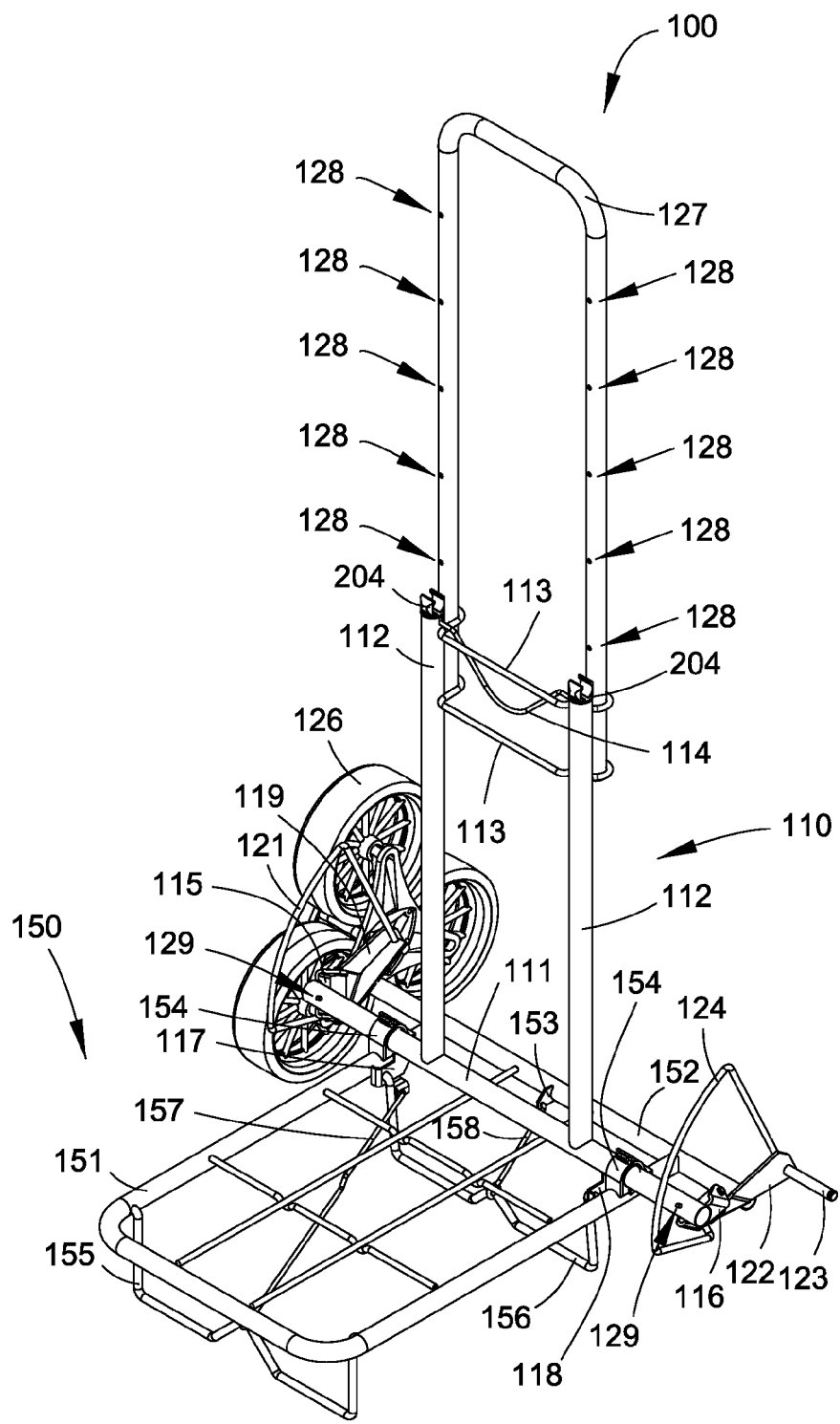
FIG. 2 depicts a perspective view the embodiment shown in FIG. 1 with the hub on one side not shown.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the present teachings.

Referring to FIGS. 1-2 and 8-10B, in one embodiment, a frame 110 of a cart 100 includes a lateral member 111 that support parallel studs 112 joined at ends opposite to the lateral member 111 by guides 113, a latch 114 biased toward a handle 127, arm brackets 115 and 116, and support brackets 117 and 118. Pivot axes of the arm brackets 115 and 116 may be positioned symmetrically and at acute angles to the frame 110 and the symmetry plane. The angles to the symmetry plane may be in a range from about 30 to about 75°, preferably about 60°, and the angle to the frame 110 may be in a range about from 15 to 55°, preferably 35°. An arm 119 with a cantilevered axle 120 and a guard 121 may be rotatably inserted into the arm bracket 115. Correspondingly, an arm 122 with a cantilevered axle 123 and a guard 124 may be rotatably inserted into the arm bracket 116. Hubs 125 with wheels 126 may be positioned onto the axles 120 and 123. The handle 127 may slide trough the guides 113 such that holes 128 may be engaged by the latch 114 when the holes 128 align with corresponding holes (not shown) in the studs 112. Similarly, pins 129 may engage the arms 119 and 122 at least in predetermined unfolded and folded positions through corresponding holes in the lateral member 111 and in the arms 119 and 122. Methods and means of fixing positions of one part relative to another well known in the art so, those of ordinary skill in the art will readily envision a variety of other means and/or structures for performing the function described above.

A platform 150 of the cart 100 includes a bed 151 with a stop bar 152, a pivot 153, and bearings 154. A support 155 may be inserted into corresponding holes in the bed 151 and a support 156 may be inserted into corresponding holes in the support brackets 117 and 118. A link 157 may connect the support 155 with the support bracket 117, while a link 158 may connect the support 156 with the pivot 153. The bearings 154 may be positioned over the lateral member 111 allowing the platform 150 to rotate between positions when the stop bar 152 engages the arms 119, 122 and when the platform 150 touches the studs 112.

Figure 3:
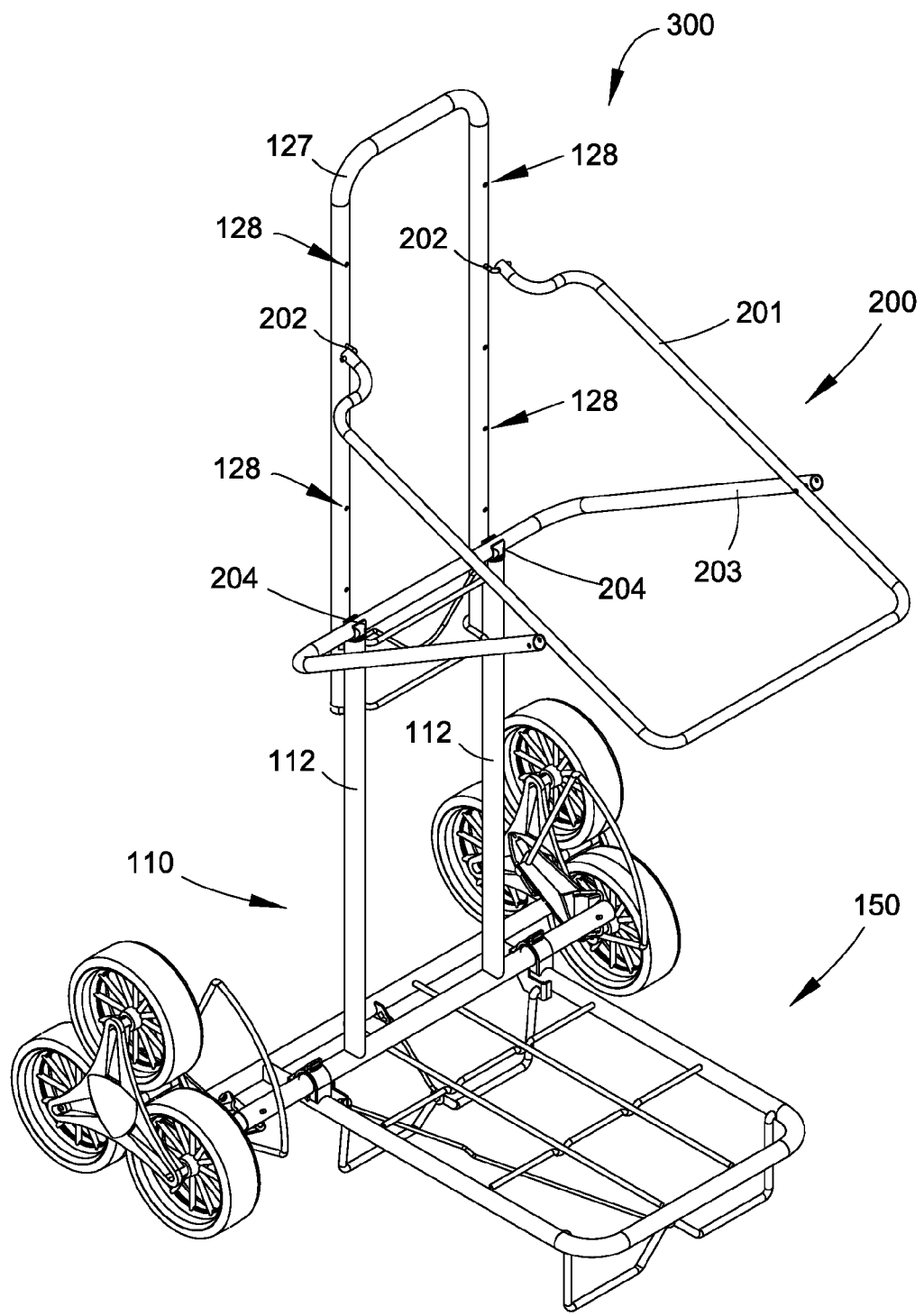
FIG. 3 depicts a perspective view of an embodiment of the cart chassis according to present invention.
Figure 4:
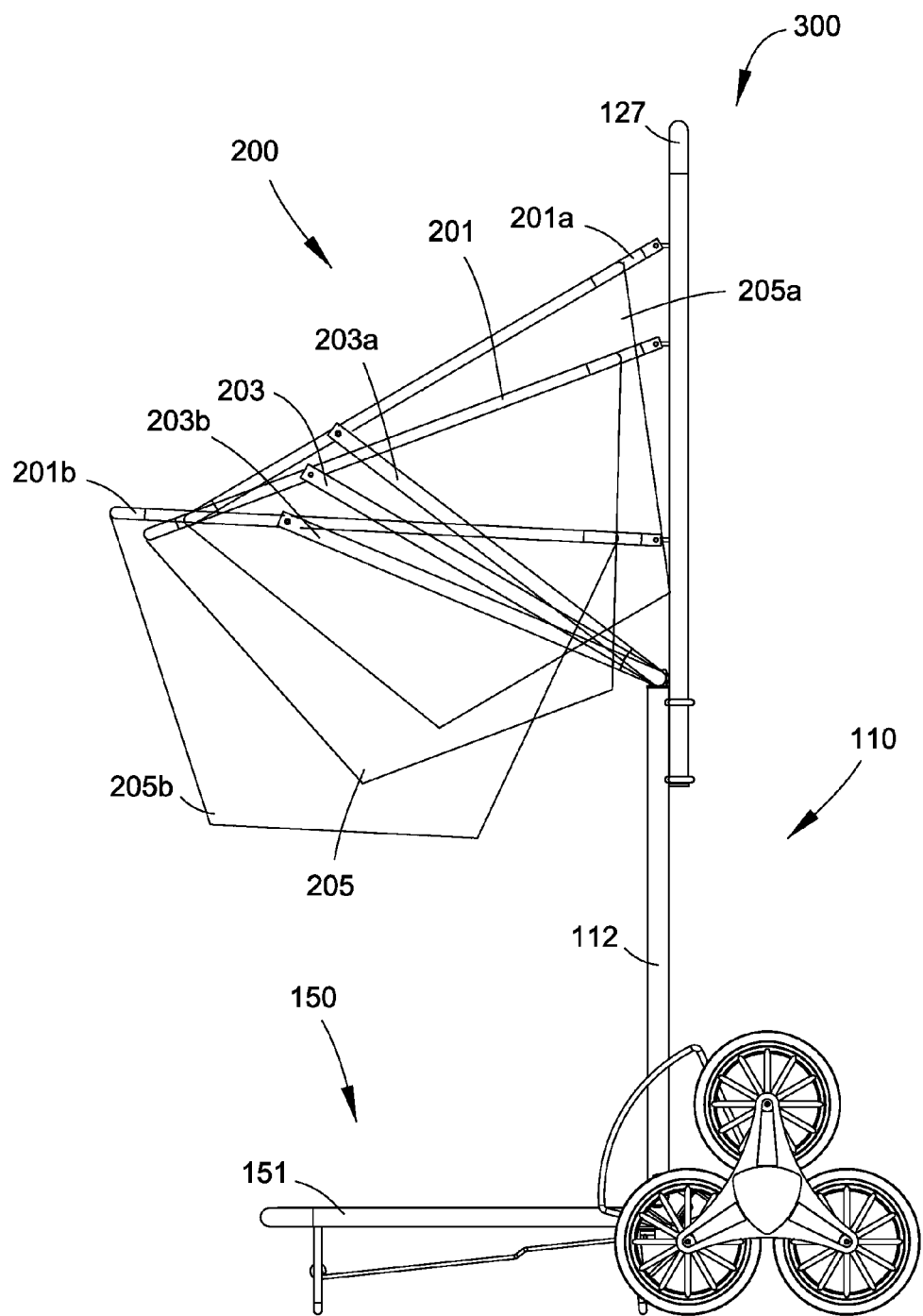
FIG. 4 depicts a side view of the embodiment shown in FIG. 3.
Figure 8:
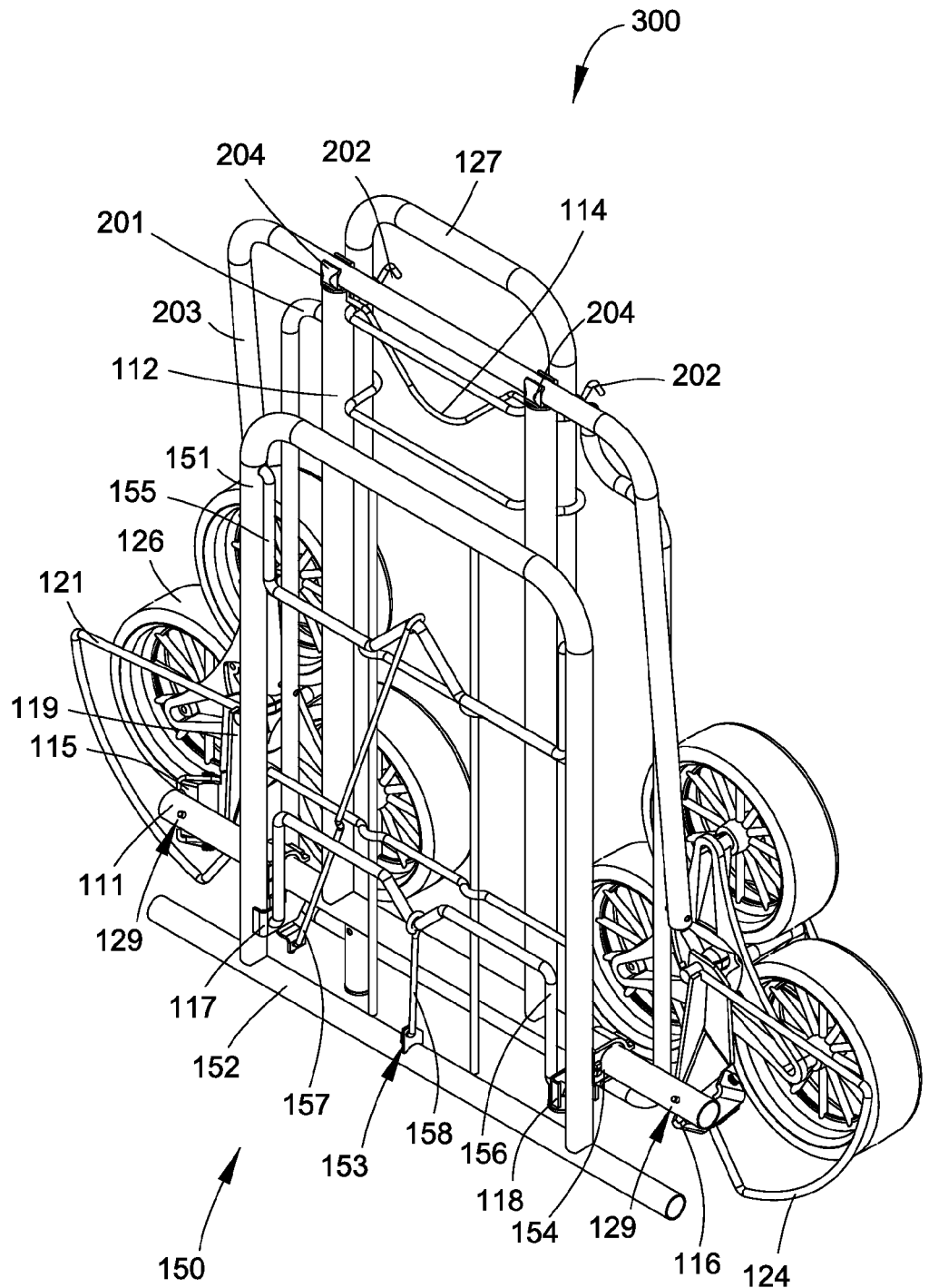
FIG. 8 depicts a perspective view of an embodiment of the cart chassis in folded state according to present invention.

Referring to FIGS. 3, 4 and 8, in another embodiment, the cart 300 includes a detachable carrier 200 including a rim 201 with hooks 202 and attached pivotally a brace 203 as well as a container 205 (for clarity not shown in FIG. 3 and shown schematically in FIG. 4). The hooks 202 may be inserted into the holes 128 in the handle 127. The brace 203 may be placed into nests 204 attached to the ends of the studs 112. The container 205 may be one of collapsible baskets or folding bags known in the art. Referring to FIG. 4, numerals 201a, 203a, and 205a signify the most, and numerals 201b, 203b, and 205b signify the least practically possible inclined positions of the carrier 200.

FIGS. 5A-7D depict the chassis operation, according to some embodiments of the present invention, in various phases of traversing, e.g. rolling over, obstacles. On a flat surface, as shown in FIG. 5A, the hub 125 may position with two of the wheels 126 supporting the load. When the hub 125 encounters a depression, as shown in FIG. 5B, the front wheel 126 lowers into the depression and, if it deep enough, stops. Then the hub 125 rotates around an axis of the stopped wheel 126, FIG. 5C, until the next wheel 126 lowers onto the surface as shown in FIG. 5D. In doing so, the hub 125 rotated one third of a revolution as indicated by a direction of the arrow in the middle of the hub 125. In effect, the hub 125 "walked" over the depression. Similarly, the hub 125 "walks" over an elevation, FIG. 6A-D. In case the elevation is significantly higher then a half of diameter of the wheel 126, the hub 125 may turn two thirds of the revolution as if the elevation of FIG. 6 followed by the depression of FIG. 5. In much the same way, as shown in FIGS. 7A-D, the hub 125 "walks" over a stairway rotating one third of the revolution for each step of the stairway. A pull force for either of the above described scenarios is a fraction of what it would have been for the conventional carts. This is particularly true when the chassis described herein is utilized for climbing the stairs as shown in FIGS. 7A-D where, even to overcome a ledge, the pull force is less than the cart weight.

Figure 9A:
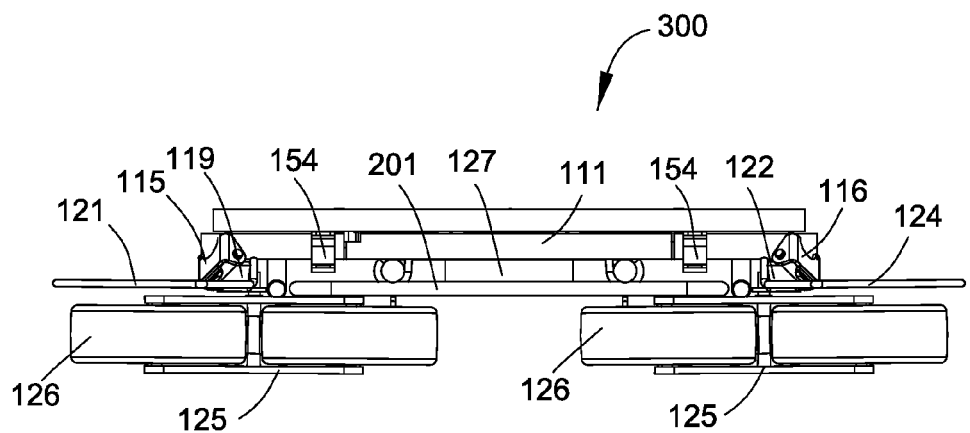
FIGS. 9A and 9B depict respectively bottom and front views of the embodiment shown in FIG. 8.
Figure 9B:
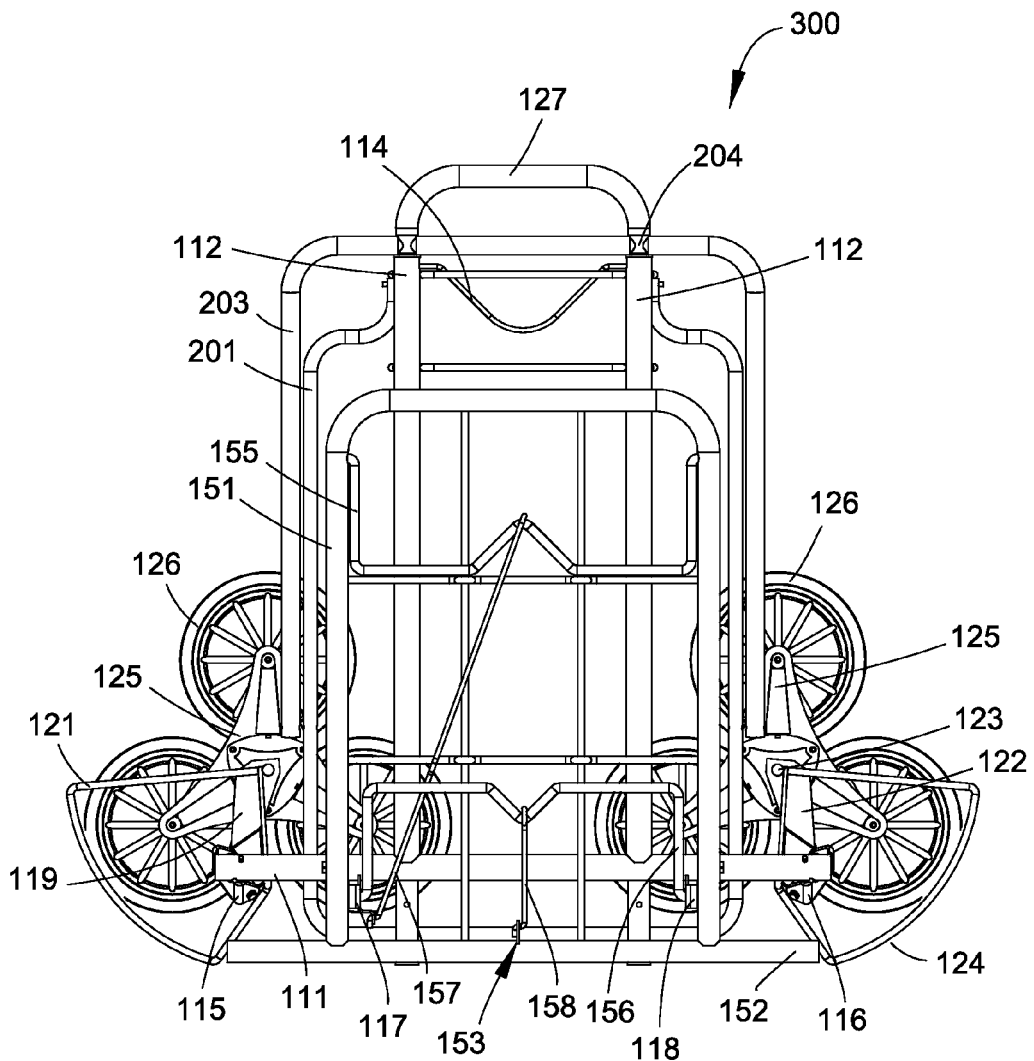

Referring to FIGS. 8 and 9A-9B, in one embodiment of the present invention, folding the cart 300 entails rotating the platform 150 up to the studs 112. By this action, the support 155 is pulled by the link 157 while the support 156 is pushed by the link 158. In the folded position of the platform 150, the supports 155 and 156, as well as the links 157 and 158, fit within the overall height of the platform 150. Following that, the folding process includes disengaging the hooks 202 from the holes 128 they were inserted in, unlatching the handle 127 and sliding it until the latch 114 engaged the topmost holes 128. After that, the brace 203 may be turned around in the nests 204 until the rim 201 with the folded/collapsed container 205 (not shown) would come to rest against the handle 127 opposite to the platform 150. Finally, the pins 129 may be released to allow the arms 119 and 122 with the hubs 125 to be swung to positions where the hubs 125 may be generally juxtaposed to the studs 112 and the lateral member 111.

Figure 10A:
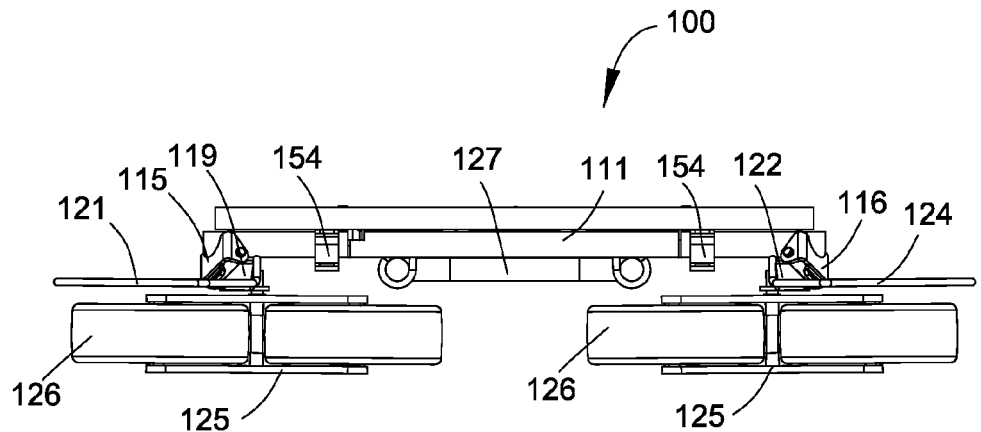
FIGS. 10A and 10B depict respectively bottom and front views in the folded state of the embodiment shown in FIG. 1.
Figure 10B:
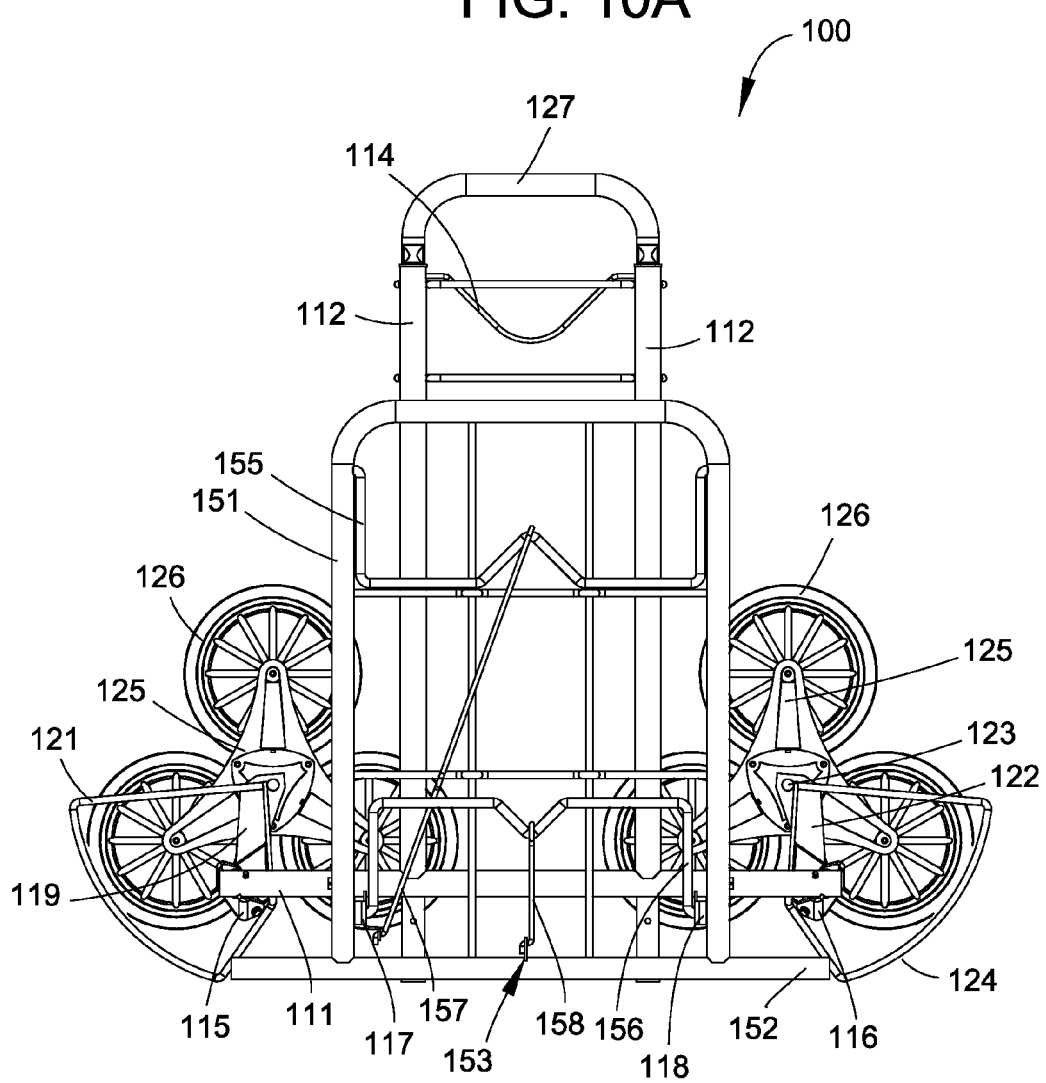
Figure 11:
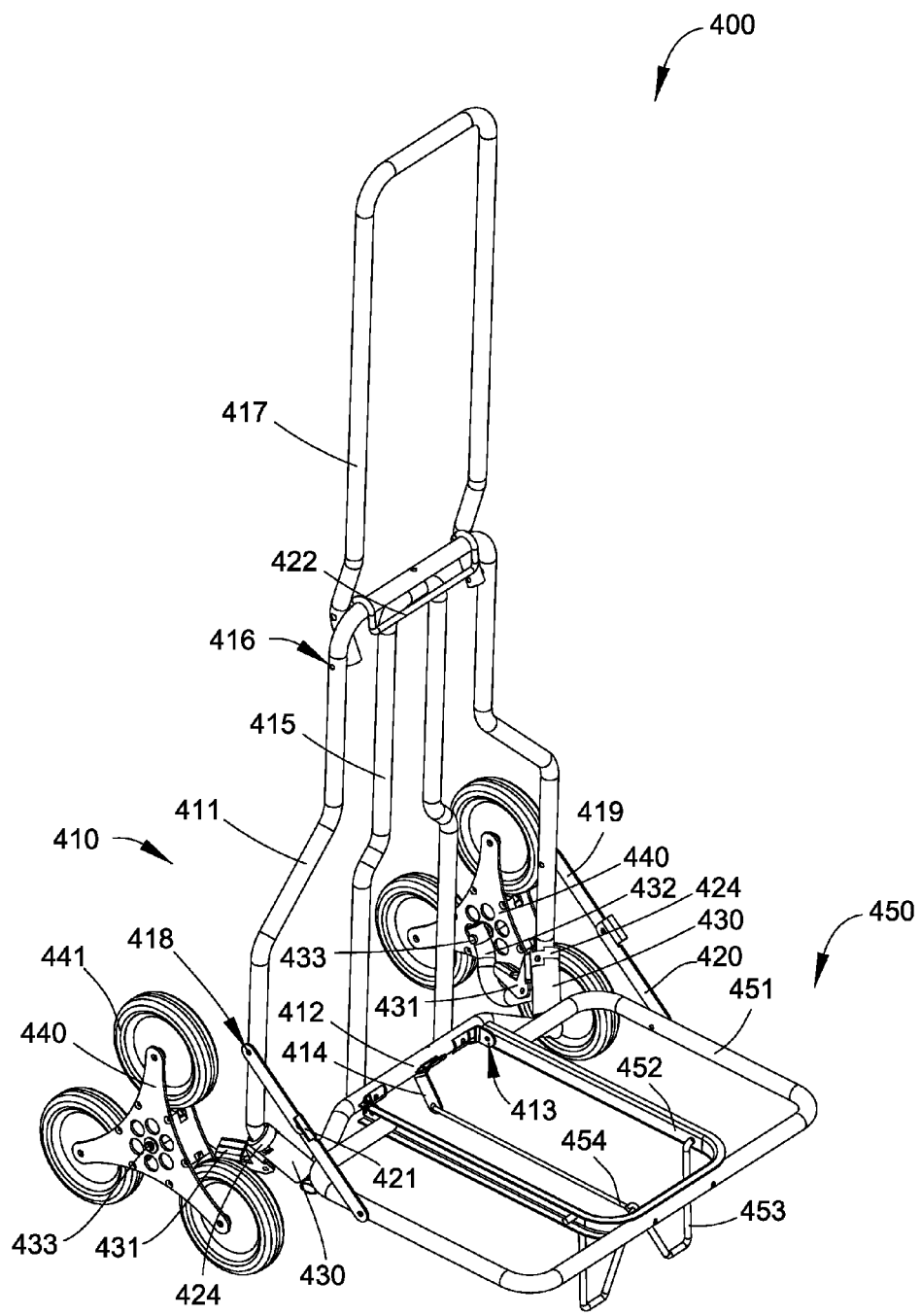
FIG. 11 depicts a perspective view of another embodiment of the cart chassis according to present invention.

Referring to FIGS. 10A and 10B, folding the cart 100, although similar, may differ from disclosed above with respect to absence of the carrier 200, which may allow the handle 127 to be retracted at any time after folding the platform 150.

Set forth for better clarity in symmetrical structures, like reference characters generally refer to like functioning mirrored parts as well as the same parts. Referring to FIGS. 11, 12A-12C, in another embodiment, a generally symmetrical framework 410 of a cart chassis 400 includes a frame 411 having end branches (not enumerated) disposed at acute angles to the symmetry plane and the framework 410, a support bar 412 connecting the end branches and having bearings 413 and a bracket 414, a support 415 fastened to the frame 411 and the support bar 412, bearings 416 for attaching a handle 417, and bearings 418 for attaching scissoring links 419 and 420 that may be latched when fully extended by a tab 421 of the link 420. The handle 417 may pivot in the bearings 416 and be latched in fully extended position by a latch 422. Arms 430 may be rotatably placed onto the end branches of the frame 411 between support bar 412 and stoppers 424 that affixed to the end branches and may be engaged by pivoting catches 431 of the arms 430. A distal end 432 of each of the arms 430 may have a cantilevered axle 433 that supports a hub 440 with wheels 441. A platform 450 includes an exterior rim 451 connected to the frame 411 by the links 419 and 420, an inner frame 452 connected to the support bar 412 by the bearings 413, and a support 453 placed rotatable into the inner frame 452 and connected by a link 454 to the bracket 414. The links 419 and 420 serve additionally as guards for preventing interference between a load and the wheels 441.

Referring to FIGS. 12A-12C, folding the cart 400 entails unlatching the links 419 and 420 by pulling the tabs 421 and rotating the platform 450 up to the framework 410. By this action, the support 453 is pulled by the link 454 and the links 419, 420 are folded. In the folded position of the platform 150 the support 453 and the link 454 fit into the overall height of the platform 150. Following unlatching the latch 422, the handle 417 may be rotated up to the support bar 412. Finally, the catches 431 may be released to allow the arms 430 with the hubs 440 to be swung to and locked again in positions where the hubs 440 may be generally juxtaposed to the framework 410. A soft bag or a collapsible basket, which for better clarity neither shown nor discussed in this description, could fit into a gap between the framework 410 and the platform 450.

Figure 13A:
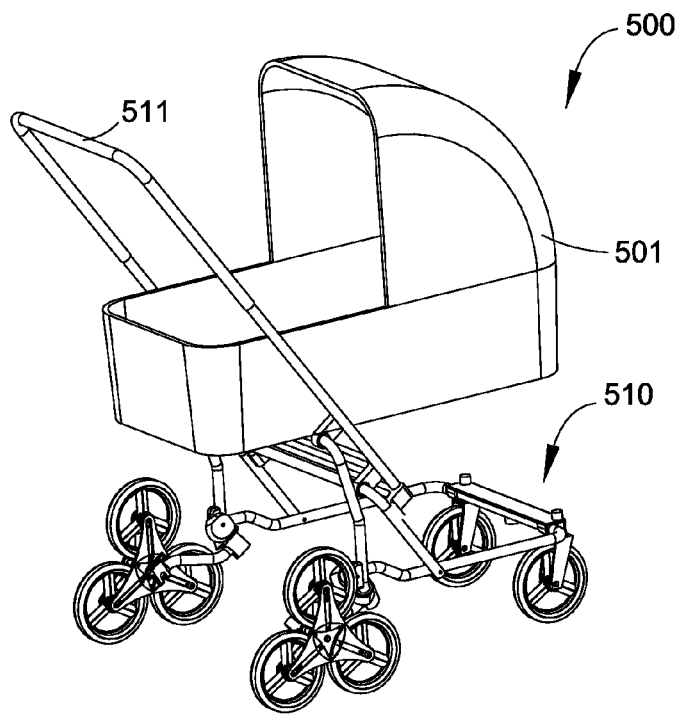
FIG. 13A depicts a perspective view of an embodiment of a stroller chassis according to present invention in unfolded state with a bassinet installed.
Figure 13B:
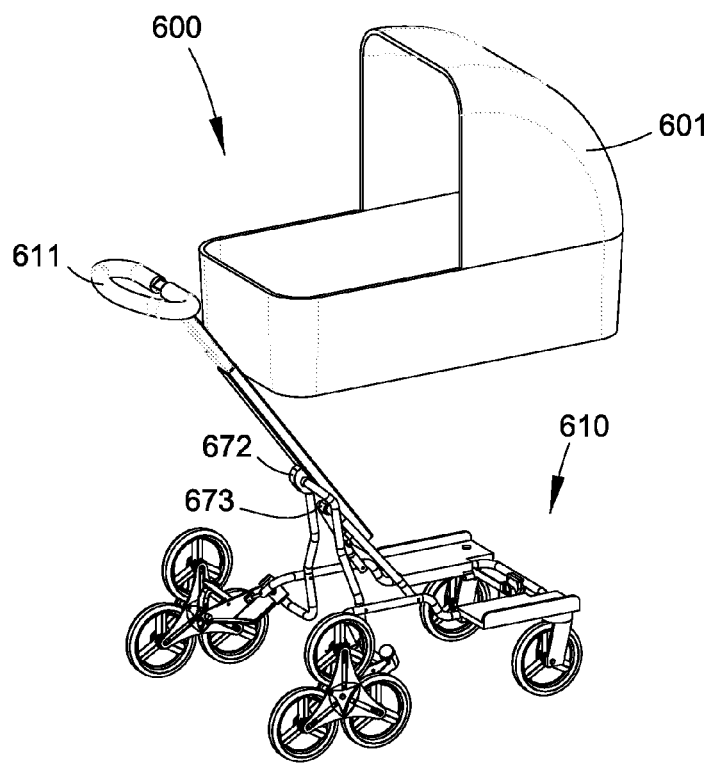
FIG. 13B depicts a perspective view of another embodiment of the stroller chassis according to present invention in unfolded state with a bassinet installed.
Figure 14:
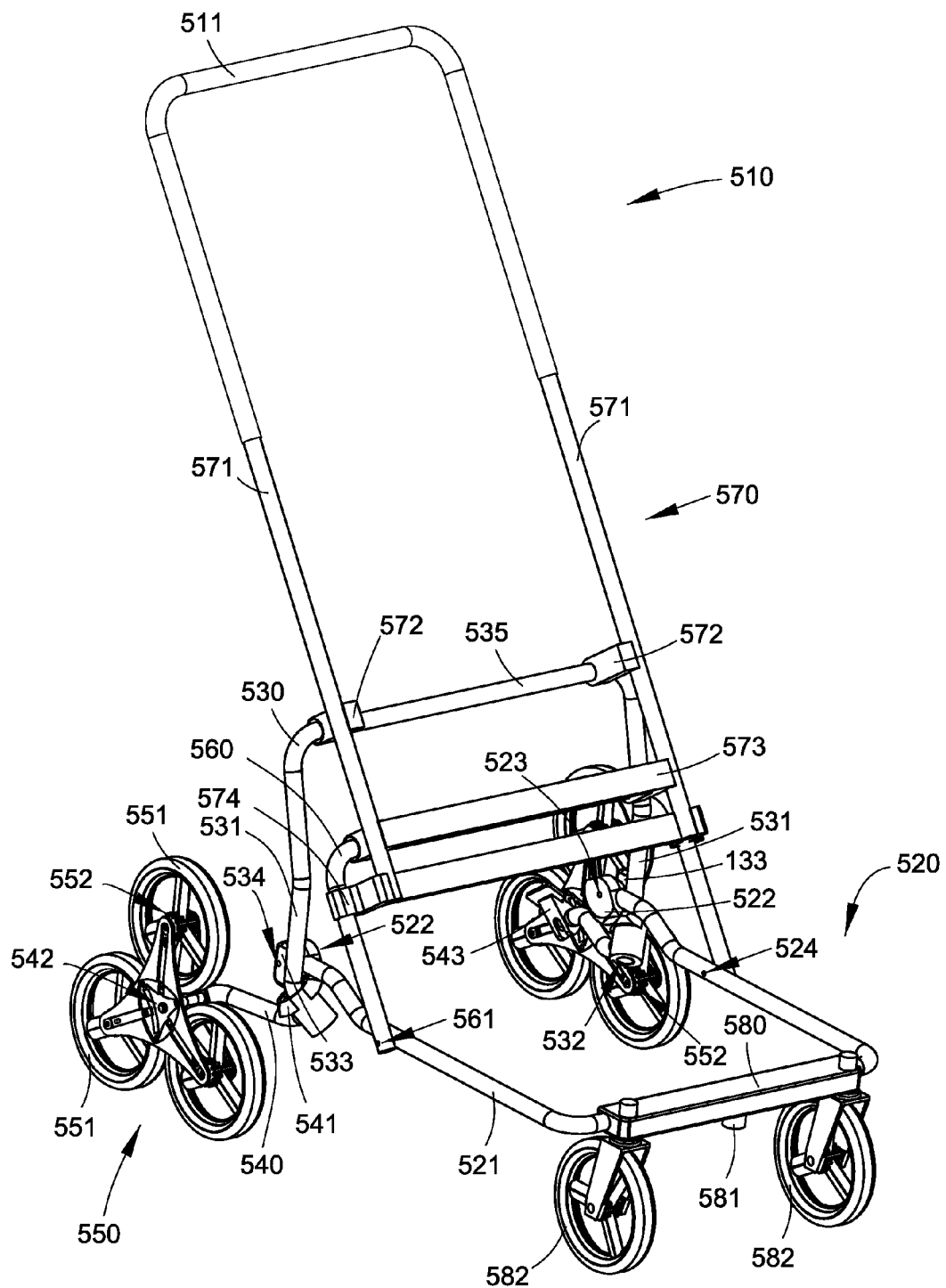
FIG. 14 depicts a perspective view of the embodiment shown in FIG. 13A.
Figure 15A:
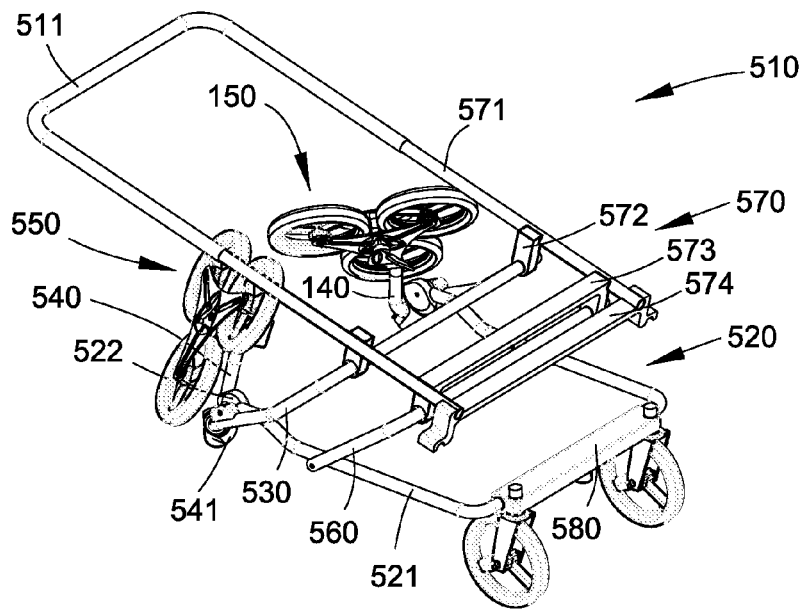
FIGS. 15A-15C depict perspective views of the embodiment shown in FIG. 13A at different stages of being folded.
Figure 15B:
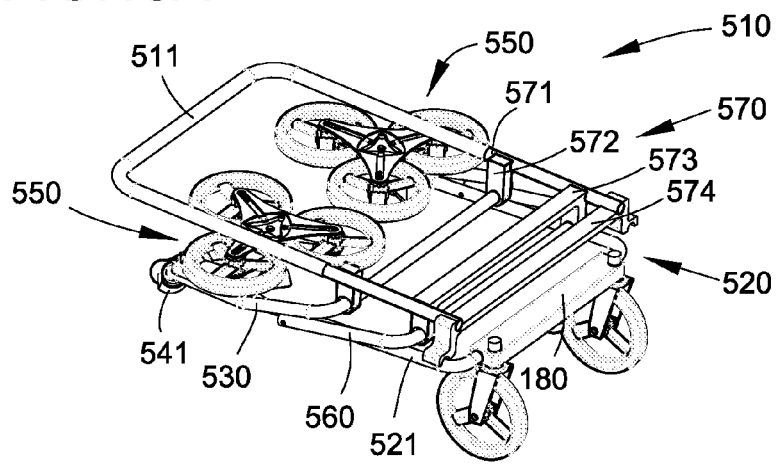
Figure 15C:
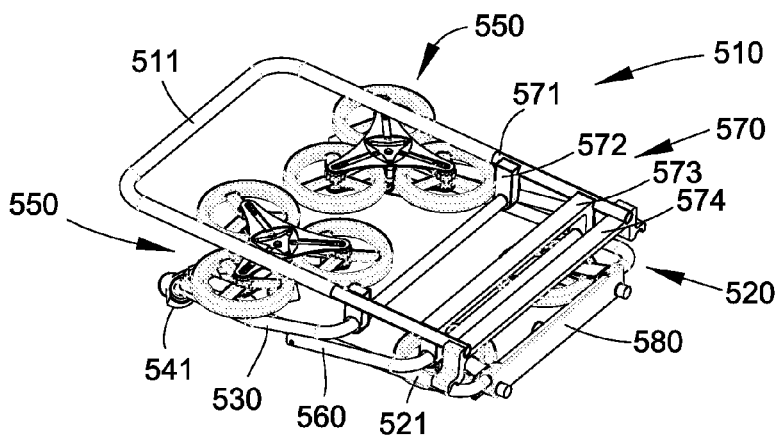
Figures 16A, 16B:
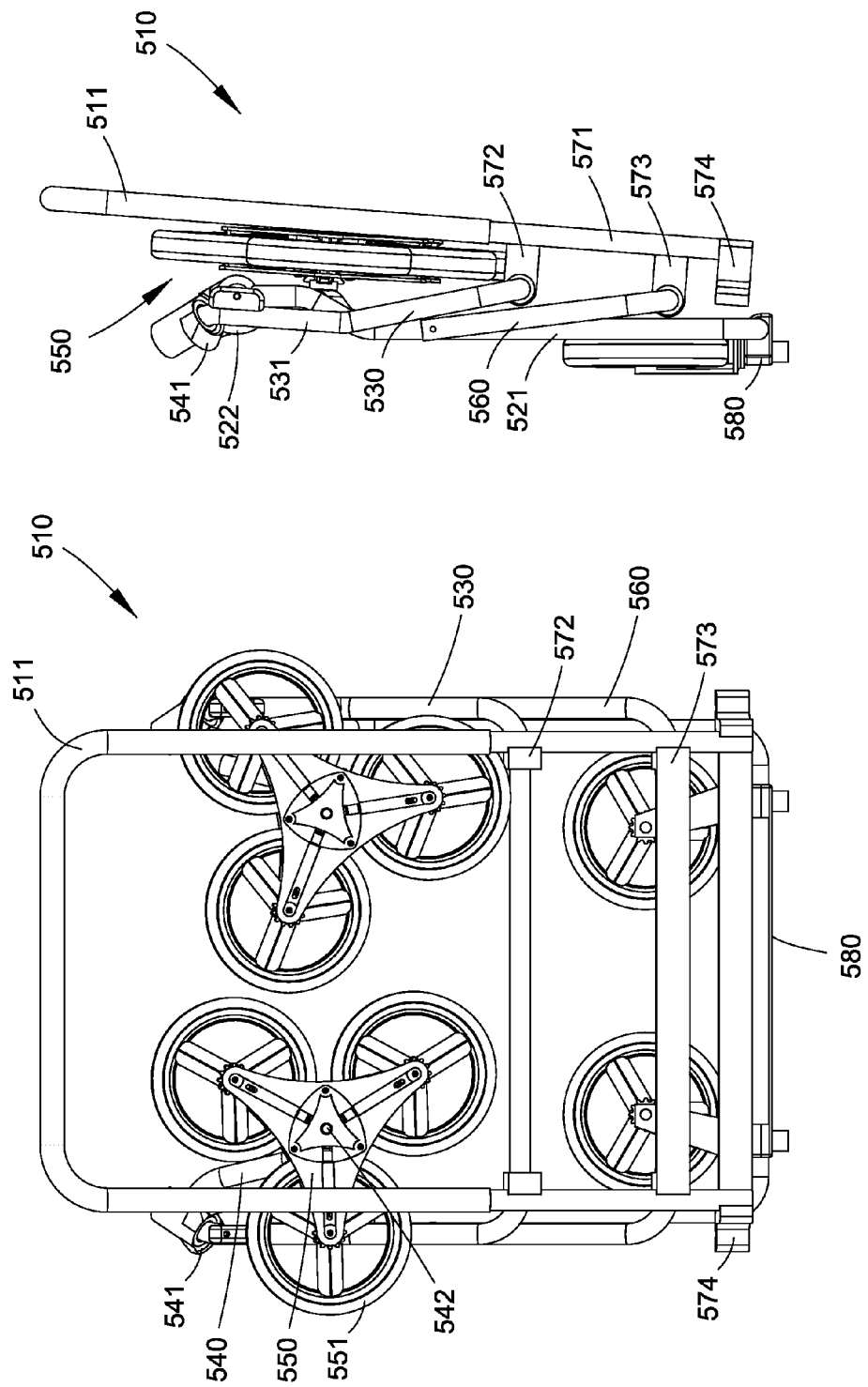
FIGS. 16A-16B depict front and side views of the embodiment shown in FIG. 15C.
Figure 17:
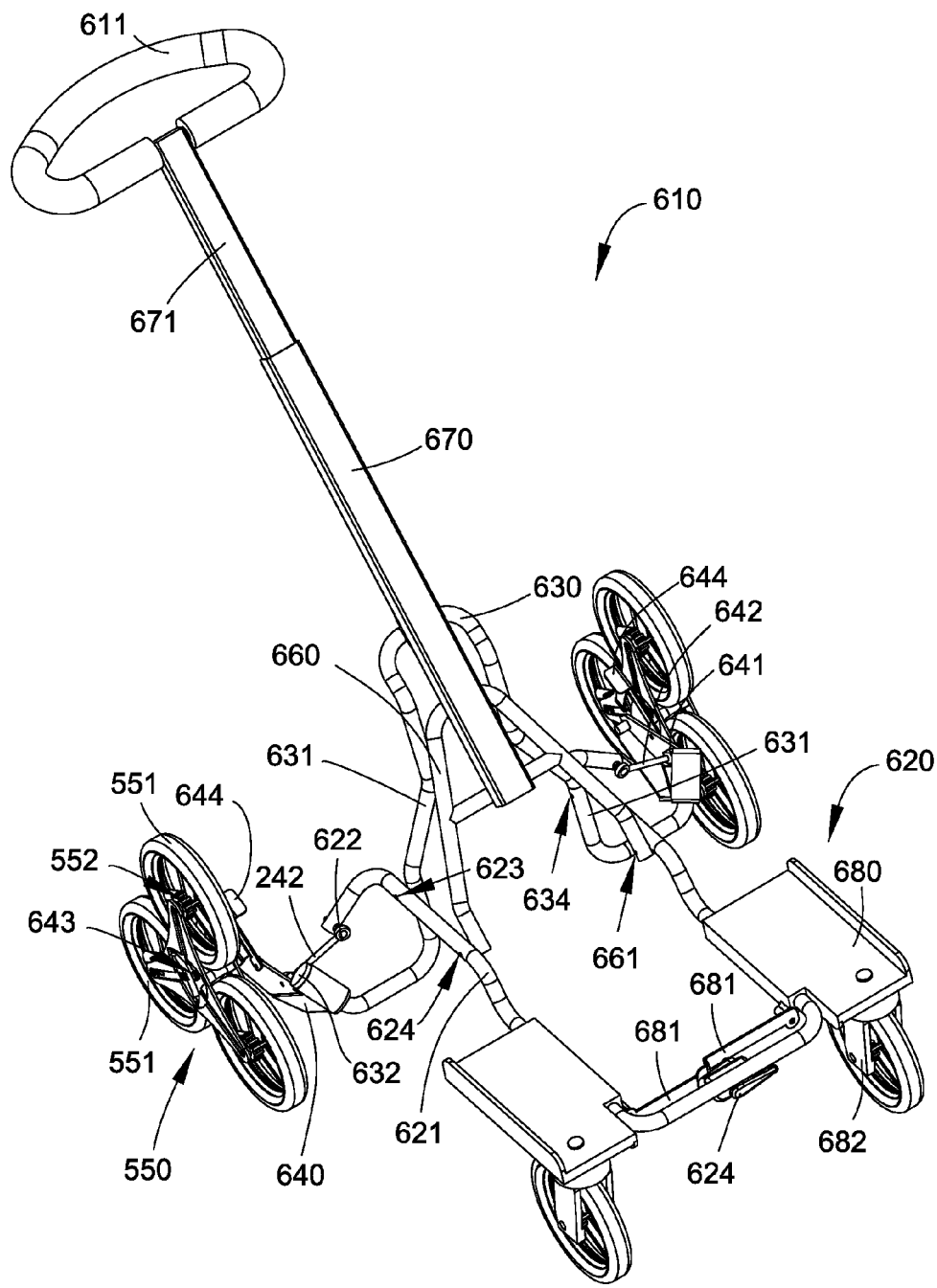
FIG. 17 depicts a perspective view of the embodiment shown in FIG. 13B.
Figure 18A:
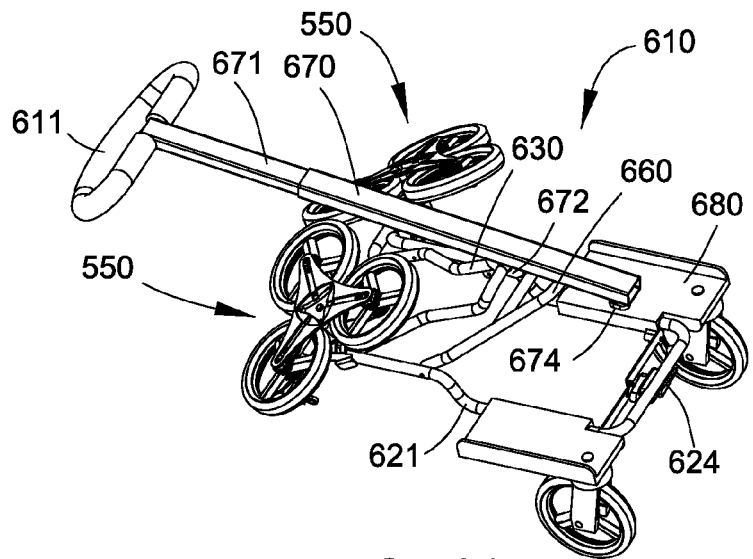
FIGS. 18A-18C depict perspective views of the embodiment shown in FIG. 1B at different stages of being folded.
Figure 18B:
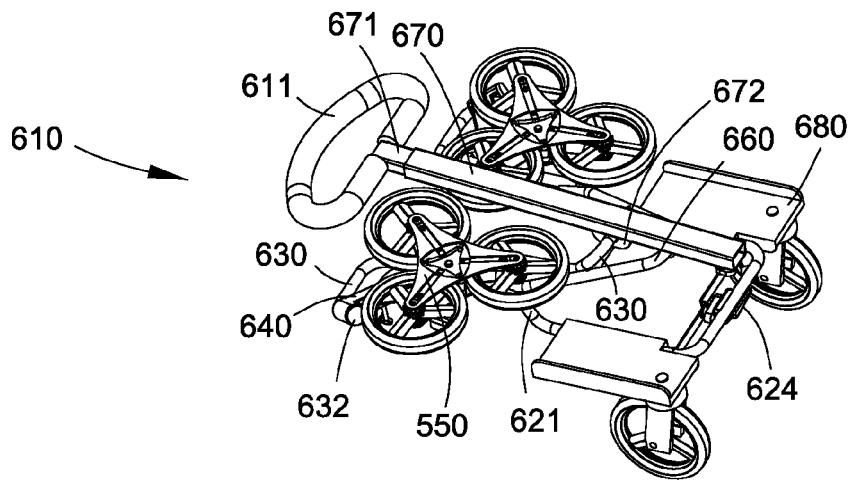
Figure 18C:
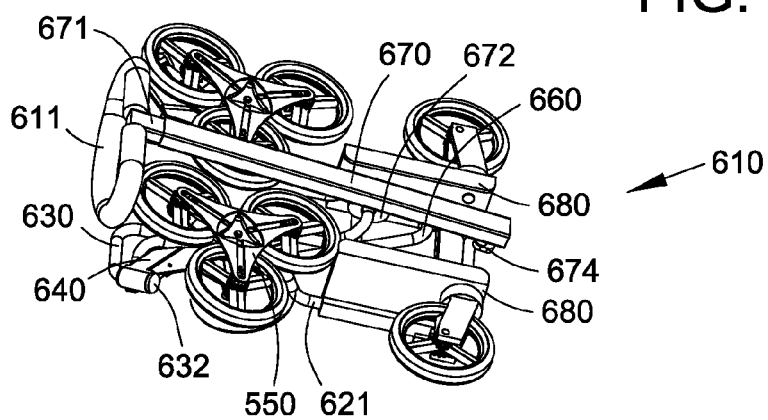

A folding chassis discussed above in connection with various embodiments of the invention, may be used in conjunction with a stroller. Referring to FIG. 13A, in one embodiment, a stroller 500 includes a generally symmetrical chassis 510 and a seat for transporting a child, such as a bassinet 501. The chassis 510 can be designed as universal and capable of fitting different seats and bassinets interchangeably. FIG. 13B shows a stroller 600 according to another embodiment of the invention, which includes a generally symmetrical chassis 610 and a seat represented by a bassinet 601. As skilled artisans will readily recognize, there is a broad variety of mechanisms known in art for latching the seats 501, 601, adjusting handles 511, 611, and securing the chassis 510, 610 in unfolded position, suitable for use with the present invention. For better clarity they are neither shown nor discussed in this description.

Referring to FIGS. 13A and 14-16B, in one embodiment, a platform 520 of the stroller chassis 510 includes a frame 521 with fixed gear segments 522 having bearings 523 for supporting a frame 530. The frame 530 with elongated parts 531 includes pivots 532 that may be at acute angles relative to the chassis' plane of symmetry and a plane perpendicular to it defined by the parts 531. The angles may be in a range from about 30 to about 60°, preferably about 45°. Blocks 533 are attached to the parts 531 in such a way that bearings 534 coaxial with bearings 523 are centered at axes of the pivots 532. The pivots 532 may support arms 540 with fixed gear segments 541 meshed with the gear segments 522. Each of the arms 540 has a cantilevered axle 542 that supports a hub 550 with wheels 551, which may have grooved hubs 552. A cam 543 engages an internal mechanism (not shown) of the hub 550 for stopping rotation of the wheels 551 by interacting with the grooved hubs 552. The internal mechanism, for example, may include a slider biased toward the cam 543 and connected to links capable of latching of grooves of the grooved hubs 552. A brace 560 may be rotatably placed onto the frame 521 with bearings 561 coaxial to bearings 524. A seat base 570 includes extensions 571, bearings 572 that may pivot around a bar 535 of the frame 530, a lateral member 573 that may pivot relative to the brace 560, and a locking device 574. The handle 511 may slide over the extensions 571. A caster block 580 may pivot over the frame 521 and comprise a stopper 581 and casters 582. Methods and means of fixing positions of one part relative to another well known in the art so, those of ordinary skill in the art will readily envision a variety of other means and/or structures for performing the function described above.

Conventionally, when operating a stroller on a rough terrain, people tend to lift front wheels of the stroller, which makes it similar to maneuvering a single axis cart. Subsequently, FIGS. 5A-7D may be attributed to the stroller operation, according to present invention, in various phases of rolling over obstacles in the "single axis" mode.

Referring to FIGS. 13B and 17-19B, in another embodiment, a platform 620 of the stroller chassis 610 includes a frame 621 with a cranking mechanism 624 and spherical pivots 622 having bearings 623 for supporting a frame 630. The frame 630 with elongated parts 631 includes bearings 634 coaxial with bearings 623 and pivots 632 that may be at acute angles relative to the chassis plane of symmetry and a perpendicular to it plane defined by the parts 631. The angles may be in a range from about 30 to about 60°, preferably about 45° to that plane, which, in turn, may be at an angle in range from about 0 to about 20°, preferably about 8° to the elongated parts 631. The pivots 632 may support arms 640 with spherical bearings 641. Links 642 constructed for swiveling may connect the spherical pivots 622 of the platform 620 with the spherical bearings 641 of the arms 640. Each of the arms 640 may have a cantilevered axle 643 that supports a hub 550 with wheels 551, which may have grooved hubs 552. A cam 644 may engage an internal mechanism (not enumerated) of the hub 550 for stopping rotation of the wheels 551 by interacting with the grooved hubs 552. The internal mechanism, for example, includes a slider biased toward the cam 644 and connected to links capable of latching of grooves of the grooved hubs 552. A brace 660 may be rotatably placed onto the frame 621 with bearings 661 coaxial to bearings 624. A seat base 670 includes an extension 671, a bearing 672 that may pivot around a lateral part of the frame 630, a bearing 673 that may pivot relative to the brace 660, and a locking device 674. The handle 611 may hinge in the extension 671. Mirrored caster blocks 680 may pivot on the frame 621, each including a linkage 681 and a caster 682. The linkages 681 may connect to the cranking mechanism 624 capable of self latching at least in unfolded position.

Referring to FIGS. 15A-16B, in one embodiment of the present invention, folding the stroller chassis 510 intails unlocking the locking device 574 and pushing the handle 511 towards the platform 520. By this action, the frame 530 and the brace 560 are pivoted at the bearings 523 and 524 respectively. The arms 540 with the gear segments 541 rotate around the gear segments 522 bringing the hubs 550 generally to a common plane parallel to the plane defined by the parts 531. In this embodiment, angles of rotation of the frame 530 and the arms 540 preferably about 94° and 109° respectively. The caster block 580 may be rotated and the handle 511 may be slid into folded positions.

Referring to FIGS. 18A-19B, in another embodiment, folding the stroller chassis 610, intails unlocking the locking device 674 and pushing the handle 611 towards the platform 620. By this action, the frame 630 and the brace 660 are pivoted at the bearings 623 and 624 respectively. The arms 640 with the spherical bearings 641 rotate around the pivots 632 bringing the hubs 550 generally to a common plane parallel to the plane defined by the parts 631. In this embodiment, angles of rotation of the frame 630 and the arms 640 preferably about 96° and 109° respectively. The cranking mechanism 624 may be rotated pushing the linkages 681 outward that may cause the caster blocks 680 to be rotated into folded positions. The extension 671 may be slid and the handle 611 rotated into folding position as well.

Consequently, the present invention provides the improved folding chassis for handling all kinds of terrain including curbs and stairs. Furthermore, the invention provides that such chassis folds relatively flat for better handling and storage in the folded state. Moreover, the present invention facilitates greater self sufficiency for physically challenged persons by easy of use including folding/unfolding without detaching any parts.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. For example, a removable track may be fitted over the wheels 151 of each of the hubs 150 for moving over a sandy or spongy terrain. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto; inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Accordingly, as indicated above, the foregoing embodiments of the invention are examples and can be varied in many ways. Such present or future variations are not to be regarded as a departure from the spirit and scope of the invention, and all such modifications as would be apparent to one skilled in the art are intended to be included within the scope of the following claims.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one". As used herein, the term "about" refers to a +/−10% variation from the nominal value. It is to be understood that such a variation is always included in any given value provided herein, whether or not it is specifically referred to.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. It should also be understood that, unless clearly indicated to the contrary, in any methods disclosed herein that include more than one step or act, the order of the steps or acts of the method is not necessarily limited to the order in which the steps or acts of the method are recited. In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively

We claim:
1. A folding chassis comprising:
a frame having a reference plane;
an arm with an axle, said arm rotatably attached to said frame; and
a hub having a plurality of wheels, said hub rotatably disposed onto said axle;
wherein said plurality of wheels has a diameter at least equal to a half of a width of said frame, each of said plurality of wheels is rotatably attached to said hub around an axis parallel to said axle, and said arm is configured to pivot between at least a first and a second positions of said hub, wherein, in the first position, said hub is generally perpendicular to said reference plane and wherein, in the second position, said hub is adjacent and parallel to said reference plane.

2. The folding chassis of claim 1, wherein said arm configured to pivot around an axis positioned at acute angles to said reference plane and to a plane perpendicular to said reference plane.

3. The folding chassis of claim 2, wherein said axis positioned at a first angle to said reference plane in a range from about 15 to 55° and at a second angle to the plain perpendicular to said reference plane in a range from about 30 to 75°.

4. The folding chassis of claim 1, wherein said plurality of wheels comprise three wheels positioned symmetrically relative to said axle.

5. The folding chassis of claim 1, wherein said arm comprises a guard member for preventing interference between a load and said plurality of wheels.

6. The folding chassis of claim 1, further comprising a platform, said platform configured to pivot from being generally perpendicular to said frame to been generally adjacent and parallel to said frame.

7. The folding chassis of claim 6, wherein said arm and said platform are configured to support each other in the position of said hub being generally perpendicular to said reference plane and said platform being generally perpendicular to said frame.

8. The folding chassis of claim 6, further comprising a first support with a first link and a second support with a second link, wherein said first support is rotatably attached to said platform with said first link connecting said first support to said frame and said second support rotatably attached to said frame with said second link connecting said second support to said platform.

9. The folding chassis of claim 1, further comprising a handle configured to extend said frame and a detachable carrier with a rim and a brace, wherein said rim is attachable to said handle at a plurality of levels and said frame configured to support said brace.

10. A folding stroller chassis, comprising:
 a frame having a reference plane;
 an arm with an axle, said arm rotatably attached to said frame;
 a platform pivotally attached to said frame and linked to said arm, said platform configured to pivot within a predetermined range relative to said reference plane; and
 a hub having a plurality of wheels, said hub rotatably disposed onto said axle;
 wherein said plurality of wheels has a diameter at least equal to a half of a width of said frame, each of said plurality of wheels is rotatably attached to said hub around an axis parallel to said axle, and said arm configured to pivot between at least a first and a second positions of said hub, wherein, in the first position, said hub is generally perpendicular to said reference plane and wherein, in the second position, said hub is adjacent and parallel to said reference plane.

11. The folding chassis of claim 10, wherein said arm configured to pivot around an axis positioned at acute angles to said reference plane and to a plane perpendicular to said reference plane.

12. The folding chassis of claim 10, further comprising a first support and a second support, wherein said first support pivotally attached to said frame, said second support pivotally attached to said platform and said first support, and said first and second supports configured to be fixable relative to one another in at least one position.

13. The folding chassis of claim 10, wherein said plurality of wheels includes three wheels positioned symmetrically relative to said axle.

14. The folding chassis of claim 10, further comprising at least one caster configured to pivot relative to said platform and be fixable relative to said platform in at least one position.

* * * * *